United States Patent
Zhang et al.

(10) Patent No.: US 10,361,912 B2
(45) Date of Patent: Jul. 23, 2019

(54) TRAFFIC SWITCHING METHOD AND APPARATUS

(71) Applicant: HUAWEI TECHNOLOGIES CO., LTD., Shenzhen, Guangdong (CN)

(72) Inventors: Mingui Zhang, Beijing (CN); Zhenbin Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 55 days.

(21) Appl. No.: 15/391,104

(22) Filed: Dec. 27, 2016

(65) Prior Publication Data

US 2017/0111222 A1    Apr. 20, 2017

Related U.S. Application Data

(63) Continuation of application No. PCT/CN2015/082533, filed on Jun. 26, 2015.

(30) Foreign Application Priority Data

Jun. 30, 2014   (CN) .......................... 2014 1 0307865

(51) Int. Cl.
*H04L 12/24* (2006.01)
*H04L 12/26* (2006.01)
(Continued)

(52) U.S. Cl.
CPC ........ *H04L 41/0816* (2013.01); *H04L 41/083* (2013.01); *H04L 43/0882* (2013.01);
(Continued)

(58) Field of Classification Search
CPC ....... H04L 12/24; H04L 12/26; H04L 12/715; H04L 12/741; H04L 12/751;
(Continued)

(56) References Cited

U.S. PATENT DOCUMENTS 6,366,582 B1 * 4/2002 Nishikado ............. H04L 49/309
                                                         370/352
6,594,261 B1 * 7/2003 Boura ................. H04L 41/0654
                                                         370/217

(Continued)

FOREIGN PATENT DOCUMENTS

CN     101060483     10/2007
CN     101141400      3/2008
(Continued)

OTHER PUBLICATIONS

International Search Report, dated Sep. 30, 2015, in International Application No. PCT/CN2015/082533 (4 pp.).

(Continued)

*Primary Examiner* — Tri H Phan
(74) *Attorney, Agent, or Firm* — Staas & Halsey LLP (57) ABSTRACT

Embodiments of the present invention provide a traffic switching method and apparatus. The method includes: establishing a mapping relationship between a performance parameter of a network and a forwarding node switching sequence, where the performance parameter of the network includes link usage rate before switching and link usage rate after switching; when traffic switching needs to be performed, obtaining a current performance parameter of the network, and determining, according to the mapping relationship, a switching sequence corresponding to the current performance parameter; and delivering a switching instruction to forwarding nodes according to the switching sequence, so as to control the forwarding nodes to sequentially perform traffic switching. In this way, traffic switching can be systematically implemented, thereby effectively avoiding a link congestion phenomenon in a switching process, and ensuring network performance.

10 Claims, 5 Drawing Sheets

(51) Int. Cl.
*H04L 12/801* (2013.01)
*H04L 12/755* (2013.01)
*H04L 12/751* (2013.01)
*H04L 12/715* (2013.01)

(52) U.S. Cl.
CPC .......... *H04L 45/021* (2013.01); *H04L 45/025* (2013.01); *H04L 47/127* (2013.01); *H04L 45/64* (2013.01)

(58) Field of Classification Search
CPC . H04L 12/755; H04L 12/801; H04L 41/0816; H04L 41/083; H04L 43/0882; H04L 47/127; H04L 45/021; H04L 45/025; H04L 45/64
See application file for complete search history.

(56) References Cited

U.S. PATENT DOCUMENTS

| | | | | |
|---|---|---|---|---|
| 7,302,494 B2 * | 11/2007 | Hayashi | .................. | H04L 47/11 709/223 |
| 7,567,523 B2 * | 7/2009 | Black | .................... | H04L 12/462 370/255 |
| 7,904,586 B1 * | 3/2011 | Griffin | .................... | H04L 45/00 709/238 |
| 8,331,387 B2 | 12/2012 | Kwan et al. | | |
| 8,830,873 B2 * | 9/2014 | Tomic | .................. | H04L 12/462 370/255 |
| 8,855,006 B2 * | 10/2014 | Gloss | ................. | H04L 41/0896 370/253 |
| 9,077,562 B2 * | 7/2015 | Rajagopalan | ....... | H04L 12/4641 |
| 9,887,923 B2 * | 2/2018 | Chorafakis | ............. | H04L 47/22 |
| 2004/0052226 A1 * | 3/2004 | Frank | ................. | H04L 41/0816 370/329 |
| 2011/0007670 A1 | 1/2011 | Yan | | |
| 2012/0163387 A1 | 6/2012 | Lv et al. | | |
| 2012/0307641 A1 * | 12/2012 | Arumilli | ............... | H04L 47/125 370/241 |
| 2012/0314577 A1 * | 12/2012 | Sun | .......................... | H04L 47/12 370/235 |
| 2013/0058208 A1 * | 3/2013 | Pfaff | ................... | H04L 12/4633 370/217 |
| 2013/0083701 A1 * | 4/2013 | Tomic | ................... | H04L 12/462 370/255 |
| 2013/0121154 A1 * | 5/2013 | Guay | .................... | H04L 45/125 370/236 |
| 2014/0112337 A1 * | 4/2014 | Lam | ....................... | H04L 49/10 370/352 |
| 2017/0155599 A1 * | 6/2017 | Vobbilisetty | ........... | H04L 49/25 |

FOREIGN PATENT DOCUMENTS

| | | |
|---|---|---|
| CN | 101588298 | 11/2009 |
| CN | 102893562 | 1/2013 |
| CN | 103124241 | 5/2013 |

OTHER PUBLICATIONS

Office Action, dated Nov. 6, 2017, in Chinese Application No. 201410307865.2 (6 pp.).
Extended European Search Report, dated Jun. 22, 2017, in European Application No. 15815432.8 (6 pp.).
Hong, C.Y. et al., *Achieving High Utilization with Software-Driven WAN*, SIGCOMM'13, Aug. 12-16, 2013, Hong Kong, China (12 pp.).
Hongqiang Harry Liu et al., "zUpdate: Updating Data Center Networks with Zero Loss," SIGCOMM, ACM, Aug. 27, 2013, XP058030622, pp. 411-422.
Communication Pursuant to Article 94(3) EPC, dated Feb. 14, 2019, in European Application No. 15815432.8 (6 pp.).

* cited by examiner

TRAFFIC SWITCHING METHOD AND APPARATUS

This application claims priority to Chinese Patent Application No. CN 201410307865.2, filed with the Chinese Patent Office on Jun. 30, 2014 and entitled "TRAFFIC SWITCHING METHOD AND APPARATUS", which is incorporated herein by reference in its entirety.

TECHNICAL FIELD

The present invention relates to the field of communications technologies, and specifically, to a traffic switching method and apparatus.

BACKGROUND

Software-defined networking (Software Defined Network, SDN) is a new network architecture, which implements flexible control on network traffic by separating a control plane of a network device from a data plane.

During route configuration, a centralized control point controller in the SDN network may perform overall calculation on a network route according to a network environment, and deliver a forwarding table obtained through calculation to a corresponding forwarding node. In this way, the forwarding node may perform traffic forwarding by using the forwarding table received by the forwarding node.

In an actual application process, the SDN may support multiple network topologies. Therefore, the controller may obtain through calculation a forwarding table of each forwarding node in each topology, and deliver the forwarding table to a corresponding forwarding node. In this way, one forwarding node may save multiple forwarding tables. Moreover, switching between different forwarding tables is implemented under the control of the controller, so that the forwarding node can perform traffic forwarding by using a correct forwarding table.

Currently, the controller controls a forwarding node to switch a forwarding table mainly in the following two manners:

In the first manner, the controller delivers all switching instructions to all forwarding nodes in a network. In this manner, a forwarding node receiving the switching instruction is immediately switched from an old forwarding table to a new forwarding table according to the instruction. However, considering that it is impossible for all the forwarding nodes to complete forwarding table switching at a same moment, that is, in a switching process, some forwarding nodes have been switched to the new forwarding table according to the switching instruction, and use the new forwarding table to perform traffic forwarding, but some forwarding nodes are not switched to the new forwarding table, and use the old forwarding table to perform traffic forwarding. Consequently, link congestion may occur in a service migration process, and network performance deteriorates.

In the second manner, the controller delivers a switching instruction to forwarding nodes one by one. In this manner, a forwarding node receiving the switching instruction is immediately switched to a new forwarding table, and a forwarding node not receiving the switching instruction continues using the old forwarding table. Consequently, a time consumed in a switching process is long. In addition, link congestion may also occur, and network performance cannot be ensured.

In conclusion, the existing switching methods may lead to a link congestion problem. Currently, a new switching manner is urgently required.

SUMMARY

Embodiments of the present invention provide a traffic switching method and apparatus, so as to implement sequential switching of forwarding nodes, and avoid a link congestion problem.

Therefore, the following technical solutions are provided in the embodiments of the present invention:

According to a first aspect, an embodiment of the present invention provides a traffic switching method, where the method includes:

establishing a mapping relationship between a performance parameter of a network and a forwarding node switching sequence, where the performance parameter of the network includes link usage rate before switching and link usage rate after switching;

when traffic switching needs to be performed, obtaining a current performance parameter of the network, and determining, according to the mapping relationship, a switching sequence corresponding to the current performance parameter; and delivering a switching instruction to forwarding nodes according to the switching sequence, so as to control the forwarding nodes to sequentially perform traffic switching.

In a first possible implementation manner of the first aspect, the establishing a mapping relationship between a performance parameter of a network and a forwarding node switching sequence includes:

dividing the forwarding nodes to different switching groups, where each forwarding node belongs to only one switching group;

determining a switching sequence of switching groups according to an increment in link usage rate in a switching process, where a sum of the increment and the link usage rate before switching is not greater than a preset value; and determining a switching sequence of the forwarding nodes according to the switching sequence of the switching groups.

With reference to the first possible implementation manner of the first aspect, in a second possible implementation manner, the switching sequence of the switching groups is determined in the following manner:

a target function: min Z; and
constraint conditions:

$$\begin{cases} \sum_{i=1}^{N} x_{n,i} = 1, (n = 1, 2, \ldots, N) & (1) \\ y_i \geq \sum_{n=1}^{N} x_{n,i} (i = 1, 2, \ldots, N) & (2) \\ \sum_{n=1}^{N} x_{n,i} * t_{n,e} \leq 1 - s_e - \sum_{j=1}^{i-1} \sum_{n=1}^{N} x_{n,i} * c_{n,e}, & (3) \\ \quad (i = 1, 2, \ldots, N; e = 1, 2, \ldots, M) \\ y_{i+1} \leq y_i, (i = 1, 2, \ldots, N-1) & (4) \\ Z = \sum_{i=1}^{N} y_i & (5) \\ x_{n,i} = 0 \text{ or } x_{n,i} = 1, (n = 1, 2, \ldots, N; i = 1, 2, \ldots, N) & (6) \\ y_i = 0 \text{ or } y_i = 1, (i = 1, 2, \ldots, N), & (7) \end{cases}$$

where Z represents a quantity of switching groups; N represents a quantity of forwarding nodes; M represents a quantity of links; $x_{n,i}$ represents that a forwarding node n belongs to an $i^{th}$ switching group; $y_i$ represents whether the $i^{th}$ switching group is an empty set; $s_e$ represents link usage rate before switching of a link e; $c_{n,e}$ represents a variation of link usage rate of the link e that is caused by the forwarding node n; and $t_{n,e}$ represents an increment in the link usage rate of the link e that is caused by the forwarding node n.

With reference to the first aspect or the first or the second possible implementation manner of the first aspect, in a third possible implementation manner, the obtaining a current performance parameter of the network includes:

collecting traffic information of the network in a preset time period; and calculating the link usage rate before switching according to the traffic information and an old forwarding table that is used before switching, and calculating the link usage rate after switching according to the traffic information and a new forwarding table that is used after switching.

With reference to any one of the first aspect or the first to the third possible implementation manners of the first aspect, in a fourth possible implementation manner, the delivering a switching instruction to forwarding nodes according to the switching sequence includes:

delivering the switching instruction to a current forwarding node according to the switching sequence; and receiving a switching completion instruction sent by the current forwarding node, and if a forwarding node that is not switched still exists according to the switching sequence, continuing to deliver the switching instruction to the forwarding node that is not switched.

With reference to any one of the first aspect or the first to the third possible implementation manners of the first aspect, in a fifth possible implementation manner, the delivering a switching instruction to forwarding nodes according to the switching sequence includes:

delivering the switching instruction to a current forwarding node according to the switching sequence, and starting timing; and if a preset time is reached, and a forwarding node that is not switched still exists according to the switching sequence, continuing to deliver the switching instruction to the forwarding node that is not switched, and starting timing.

With reference to any one of the first aspect or the first to the fifth possible implementation manners of the first aspect, in a sixth possible implementation manner, the method further includes:

if the switching sequence corresponding to the current performance parameter is not determined according to the mapping relationship, prohibiting performing traffic switching, until the switching sequence corresponding to the current performance parameter can be determined.

According to a second aspect, an embodiment of the present invention provides a traffic switching apparatus, where the apparatus includes:

a mapping relationship establishment unit, configured to establish a mapping relationship between a performance parameter of a network and a forwarding node switching sequence, where the performance parameter of the network includes link usage rate before switching and link usage rate after switching;

a performance parameter obtaining unit, configured to: when traffic switching needs to be performed, obtain a current performance parameter of the network;

a switching sequence determining unit, configured to determine, according to the mapping relationship, a switching sequence corresponding to the current performance parameter; and a sending unit, configured to deliver a switching instruction to forwarding nodes according to the switching sequence, so as to control the forwarding nodes to sequentially perform traffic switching.

In a first possible implementation manner of the second aspect, the mapping relationship establishment unit includes:

a switching group division unit, configured to divide the forwarding nodes to different switching groups, where each forwarding node belongs to only one switching group;

a switching group sequence determining unit, configured to determine a switching sequence of switching groups according to an increment in link usage rate in a switching process, where a sum of the increment and the link usage rate before switching is not greater than a preset value; and a forwarding node sequence determining unit, configured to determine a switching sequence of the forwarding nodes according to the switching sequence of the switching groups.

With reference to the first possible implementation manner of the second aspect, in a second possible implementation manner, the switching group sequence determining unit determines the switching sequence of the switching groups in the following manner:

a target function: min Z; and
constraint conditions:

$$\begin{cases} \sum_{i=1}^{N} x_{n,i} = 1, (n = 1, 2, \ldots, N) & (1) \\ y_i \geq \sum_{n=1}^{N} x_{n,i} (i = 1, 2, \ldots, N) & (2) \\ \sum_{n=1}^{N} x_{n,i} * t_{n,e} \leq 1 - s_e - \sum_{j=1}^{i-1} \sum_{n=1}^{N} x_{n,i} * c_{n,e}, & (3) \\ \quad (i = 1, 2, \ldots, N; e = 1, 2, \ldots, M) \\ y_{i+1} \leq y_i, (i = 1, 2, \ldots, N - 1) & (4) \\ Z = \sum_{i=1}^{N} y_i & (5) \\ x_{n,i} = 0 \text{ or } x_{n,i} = 1, (n = 1, 2, \ldots, N; i = 1, 2, \ldots, N) & (6) \\ y_i = 0 \text{ or } y_i = 1, (i = 1, 2, \ldots, N), & (7) \end{cases}$$

where Z represents a quantity of switching groups; N represents a quantity of forwarding nodes; M represents a quantity of links; $x_{n,i}$ represents that a forwarding node n belongs to an $i^{th}$ switching group; $y_i$ represents whether the $i^{th}$ switching group is an empty set; $s_e$ represents link usage rate before switching of a link e; $c_{n,e}$ represents a variation of link usage rate of the link e that is caused by the forwarding node n; and $t_{n,e}$ represents an increment in the link usage rate of the link e that is caused by the forwarding node n.

With reference to the second aspect or the first or the second possible implementation manner of the second aspect, in a third possible implementation manner, the performance parameter obtaining unit includes:

a collection unit, configured to collect traffic information of the network in a preset time period; and a calculation unit, configured to: calculate the link usage rate before switching according to the traffic information and an old forwarding table that is used before switching, and calculate the link usage rate after switching according to the traffic information and a new forwarding table that is used after switching.

With reference to any one of the second aspect or the first to the third possible implementation manners of the second aspect, in a fourth possible implementation manner, the sending unit includes:

a sending subunit, configured to deliver the switching instruction to a current forwarding node according to the switching sequence; and a receiving unit, configured to: receive a switching completion instruction sent by the current forwarding node, and if a forwarding node that is not switched still exists according to the switching sequence, instruct the sending subunit to continue to deliver the switching instruction to the forwarding node that is not switched.

With reference to any one of the second aspect or the first to the third possible implementation manners of the second aspect, in a fifth possible implementation manner, the sending unit includes:

a sending subunit, configured to deliver the switching instruction to a current forwarding node according to the switching sequence; and a timing unit, configured to: start timing after the sending subunit delivers the switching instruction, and if a preset time is reached, and a forwarding node that is not switched still exists according to the switching sequence, instruct the sending subunit to continue to deliver the switching instruction to the forwarding node that is not switched, and start timing.

With reference to any one of the second aspect or the first to the fifth possible implementation manners of the second aspect, in a sixth possible implementation manner, the apparatus further includes:

a switching prohibition unit, configured to: when the switching sequence determining unit does not determine the switching sequence corresponding to the current performance parameter, prohibit performing traffic switching, until the switching sequence determining unit can determine the switching sequence.

According to the traffic switching method and apparatus in the embodiments of the present invention, when traffic switching needs to be performed, a controller first obtains a current performance parameter of a network, further determines, according to a pre-established mapping relationship, a forwarding node switching sequence corresponding to the current performance parameter, and sequentially controls forwarding nodes to perform traffic switching according to the switching sequence. In this way, traffic switching can be systematically implemented, thereby effectively avoiding a link congestion phenomenon in a switching process, and ensuring network performance.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show merely some embodiments recorded in this application, and a person of ordinary skill in the art may still derive other drawings from these accompanying drawings.

FIG. 2-1 is a schematic diagram of link usage rate in an old topology;

FIG. 2-2 is a schematic diagram of link usage rate in a new topology;

FIG. 2-3 is a schematic diagram of link usage rate in an all-switching process in the prior art;

FIG. 2-4 is a schematic diagram of link usage rate in a single-point switching process in the prior art;

DESCRIPTION OF EMBODIMENTS

To enable a person skilled in the art to better understand the solutions in the present invention, the following further describes the embodiments of the present invention in more detail with reference to accompanying drawings and implementation manners.

Before technical solutions in the embodiments of the present invention are described, a specific application scenario of the embodiments of the present invention is first described.

In an SDN network, a controller may perform overall route calculation once for each network topology, and deliver a calculation result corresponding to each network topology to a forwarding node. In addition, the controller may control, according to a traffic switching requirement, each forwarding node to switch a forwarding table, so that the forwarding node performs traffic forwarding by using a forwarding table satisfying the requirement.

An existing traffic switching process is described below with reference to an example.

Figure 1:
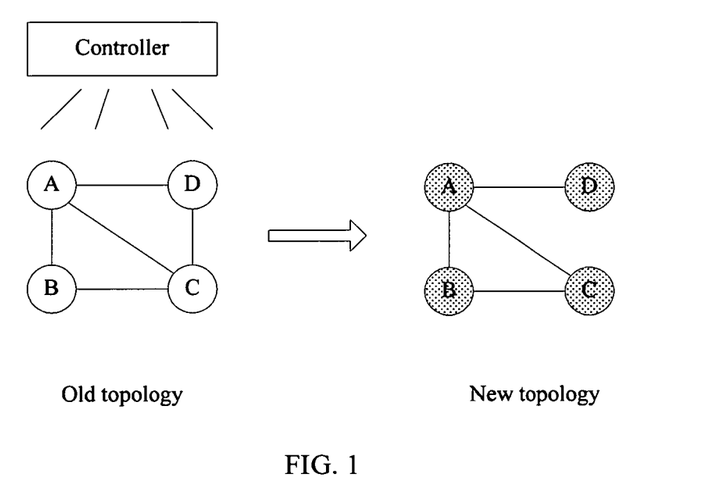
FIG. 1 is a schematic diagram of two topologies.
Figure 21:
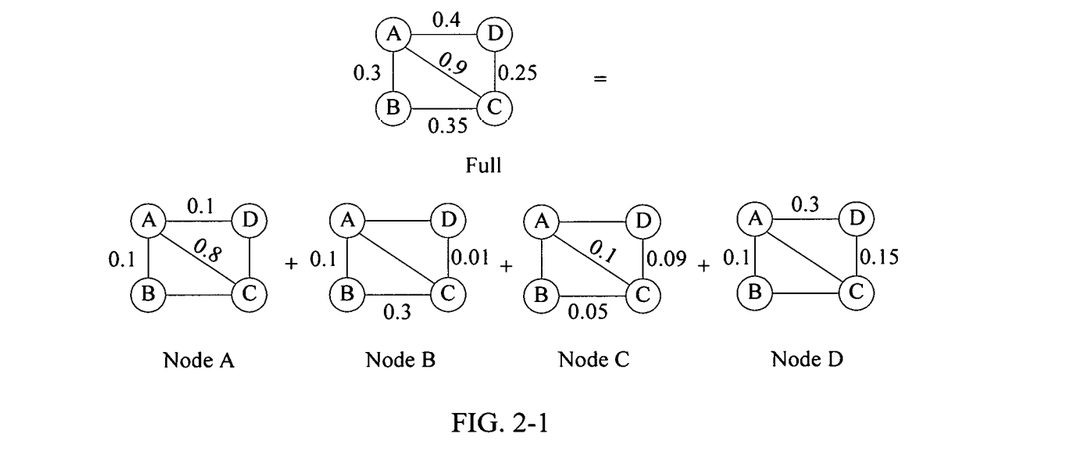
Figure 22:
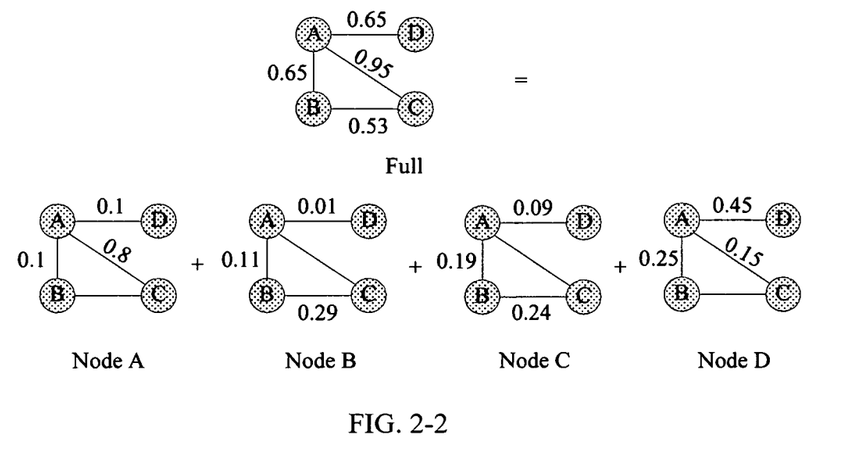

For example, there are two topologies shown in FIG. 1 for nodes A, B, C, and D. An old topology corresponds to a traffic matrix shown in the following Table 1 and an old forwarding table. A new topology corresponds to a traffic matrix shown in the following Table 2 and a new forwarding table. In this way, a schematic diagram of link usage rate in an old topology shown in FIG. 2-1 and a schematic diagram of link usage rate in a new topology shown in FIG. 2-2 may be obtained through calculation.

TABLE 1

| Source node | Destination node | | | |
| --- | --- | --- | --- | --- |
| | A | B | C | D |
| A | — | 0.1\|AB | 0.8\|AC | 0.1\|AD |
| B | 0.1\|BA | — | 0.29\|BC | 0.01\|BCD |
| C | 0.1\|CA | 0.05\|CB | — | 0.09\|CD |
| D | 0.2\|DA | 0.1\|DAB | 0.15\|DC | — |

TABLE 2

| Source node | Destination node | | | |
|---|---|---|---|---|
| | A | B | C | D |
| A | — | 0.1\|AB | 0.8\|AC | 0.1\|AD |
| B | 0.1\|BA | — | 0.29\|BC | 0.01\|BAD |
| C | 0.1\|CBA | 0.05\|CB | — | 0.09\|CBAD |
| D | 0.2\|DA | 0.1\|DAB | 0.15\|DAC | — |

A process of performing traffic switching by the controller in the prior art is described below with reference to the foregoing example.

Figure 23:
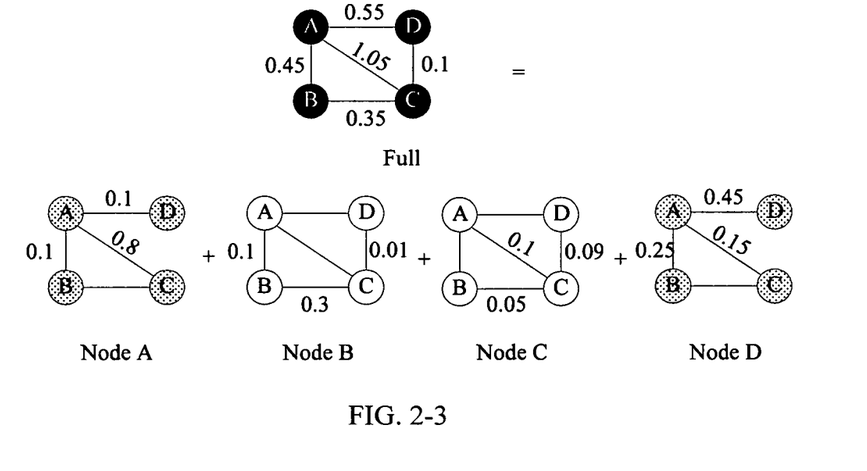

If the controller performs traffic switching in an all-switching manner, and at a particular moment, the nodes A and D have been switched to the new forwarding table according to an instruction and perform traffic forwarding according to the new forwarding table, but the nodes B and C are not switched and still perform traffic forwarding according to the old forwarding table. In this case, for a schematic diagram of link usage rate that is obtained through calculation, refer to FIG. 2-3. As can be seen from the figure, link usage rate between the nodes A and C exceeds 1, that is, a congestion phenomenon occurs on this link.

Figure 24:
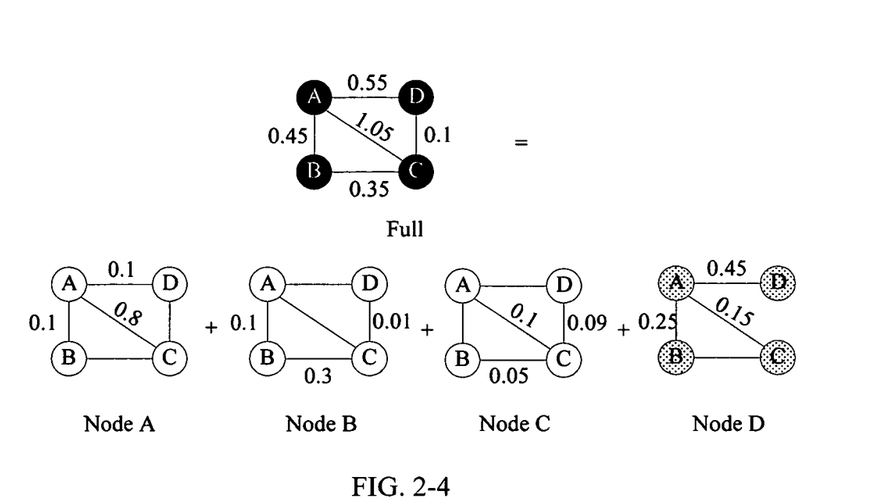

Alternatively, the controller may perform traffic switching in a single-point switching manner. If the controller controls the node D to first perform traffic switching, and the nodes A, B, and C delay switching, in this case, for a schematic diagram of link usage rate that is obtained through calculation, refer to FIG. 2-4. As can be seen from the figure, link usage rate between the nodes A and C also exceeds 1. Therefore, a congestion phenomenon may also occur on this link due to the switching.

In conclusion, regardless of whether the controller uses the all-switching manner or uses the single-point switching manner, link congestion may occur, thereby affecting network performance. Therefore, solutions are provided in the embodiments of the present invention, and a new traffic switching manner is provided, so that forwarding nodes perform switching that is not related to a time sequence, thereby avoiding a case in which link usage rate exceeds a predetermined value (generally, the predetermined value is 1) in a switching process, and further avoiding a link congestion phenomenon.

A traffic switching solution in an embodiment of the present invention is described below with reference to a specific example.

Figure 3:
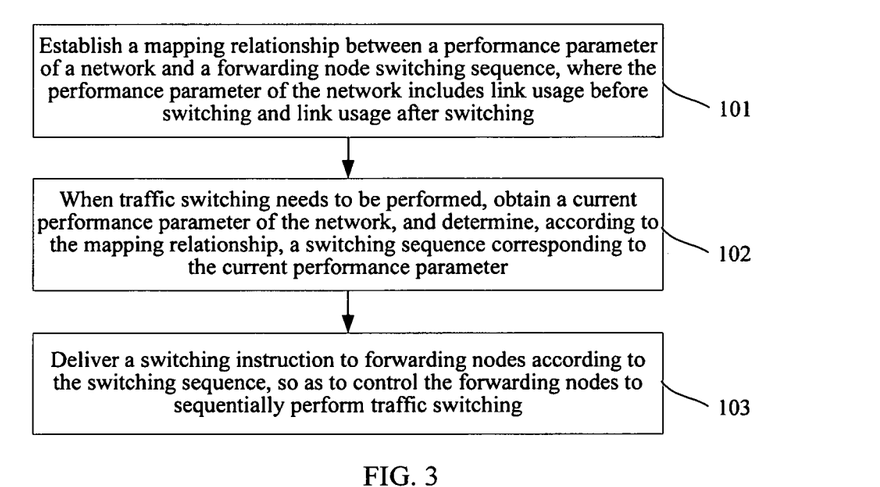
FIG. 3 is a flowchart of Embodiment 1 of a traffic switching method according to an embodiment of the present invention.

Referring to FIG. 3, FIG. 3 is a flowchart of Embodiment 1 of a traffic switching method according to an embodiment of the present invention, which may include the following steps:

Step 101: Establish a mapping relationship between a performance parameter of a network and a forwarding node switching sequence, where the performance parameter of the network includes link usage rate before switching and link usage rate after switching.

In this embodiment of the present invention, node switching sequences with different performance parameters of a network are determined by establishing a mapping relationship model, so as to ensure that after nodes are sequentially switched, a case in which link usage rate exceeds a preset value does not occur. In this way, a link congestion phenomenon can be avoided, and network performance can be ensured.

Specifically, a process of establishing the mapping relationship in this embodiment of the present invention may be embodied as follows:

first, dividing forwarding nodes to different switching groups, where each forwarding node belongs to only one switching group;

second, determining a switching sequence of switching groups according to an increment in link usage rate in a switching process, where a sum of the increment and the link usage rate before switching is not greater than a preset value; and finally, determining a switching sequence of the forwarding nodes according to the switching sequence of the switching groups.

When the forwarding node switching sequence is determined, whether forwarding nodes that can be simultaneously switched exist in the switching process is first determined, and these forwarding nodes are used as one switching group, to ensure that the nodes in the group can simultaneously perform traffic switching; and then a switching sequence of switching groups is determined according to an increment in the link usage rate that is caused by each switching group in the switching process, so as to sequentially perform traffic switching on the groups.

In an example, a process of establishing the mapping relationship in this embodiment of the present invention may be specifically embodied as follows:

A target function is: min Z, that is, Z is minimized. In this way, it can be ensured that a controller controls all forwarding nodes to complete traffic switching with a minimum quantity of times of switching. Alternatively, in a specific implementation, a value of Z is not specifically limited as mentioned above, that is, the value of Z does not need to be limited to a minimum value as long as the mapping relationship between network performance and a switching sequence can be obtained according to the following constraint conditions, that is, the value of Z may be any positive integer according to an actual need.

The constraint conditions are:

$$\begin{cases} \sum_{i=1}^{N} x_{n,i} = 1, (n = 1, 2, \ldots, N) & (1) \\ y_i \geq \sum_{n=1}^{N} x_{n,i} (i = 1, 2, \ldots, N) & (2) \\ \sum_{n=1}^{N} x_{n,i} * t_{n,e} \leq 1 - s_e - \sum_{j=1}^{i-1} \sum_{n=1}^{N} x_{n,i} * c_{n,e}, & (3) \\ (i = 1, 2, \ldots, N; e = 1, 2, \ldots, M) \\ y_{i+1} \leq y_i, (i = 1, 2, \ldots, N-1) & (4) \\ Z = \sum_{i=1}^{N} y_i & (5) \\ x_{n,i} = 0 \text{ or } x_{n,i} = 1, (n = 1, 2, \ldots, N; i = 1, 2, \ldots, N) & (6) \\ y_i = 0 \text{ or } y_i = 1, (i = 1, 2, \ldots, N), & (7) \end{cases}$$

where N represents a quantity of forwarding nodes; M represents a quantity of links; $x_{n,i}$ represents that a forwarding node n belongs to an $i^{th}$ switching group; $y_i$ represents whether the $i^{th}$ switching group is an empty set; $s_e$ represents link usage rate before switching of a link e; $c_{n,e}$ represents a variation of link usage rate of the link e that is caused by the forwarding node n; $t_{n,e}$ represents an increment in the link usage rate of the link e that is caused by the forwarding node n; and Z is a quantity of switching groups.

Meaning represented by the constraint conditions is described below:

The constraint (1) is used to represent that a node can be divided to only one switching group.

The constraint (2) is used to represent that a switching group cannot be an empty set when a migration operation is performed. In addition, the constraint (2) in this embodiment of the present invention may also be embodied as:

$$K * y_i \geq \sum_{n=1}^{N} x_{n,i}, (i = 1, 2, \ldots, N; K \text{ is } const),$$

where K is a traffic growth factor, and may be any positive integer, for example, K=1. It may be understand that in a traffic migration process, a maximum service traffic growth factor that can be borne by a network is k. For example, K=2 represents that in a service migration process, even if service traffic increases to be within a range of two times of original service traffic, congestion does not occur.

The constraint (3) is used to represent that nodes belonging to a same switching group need to satisfy a condition that is not related to a time sequence. It may be understood that for a link e, an increment in link usage rate of this link that is caused by switching performed by all nodes in $i^{th}$ switching (that is, all forwarding nodes included in the $i^{th}$ switching group) cannot exceed an allowed variation of this link. Herein, the allowed variation may be embodied as:

$$1 - s_e - \sum_{j=1}^{i-1} \sum_{n=1}^{N} x_{n,j} * c_{n,e}.$$

The constraint (4) is used to represent that the migration operation needs to be continuous without a null operation, that is, each migration operation controls forwarding nodes included in one switching group to perform traffic switching.

The constraint (5) is used to represent that a quantity of switching groups is equal to a quantity of non-null migration operations.

The constraint (6) is used to represent a value of $x_{n,i}$, $n_{n,i}=0$ represents that a node n does not belong to the switching group i, and $x_{n,i}=1$ represents that the node n belongs to the switching group i.

The constraint (7) is used to represent a value of $y_i$, $y_i=0$ represents an empty set, and $y_i=1$ represents a non-empty set.

It should be noted that a variation of link usage rate may be embodied as an increment and a decrement. The decrement refers to that the link usage rate decreases on the original basis. In this case, link congestion will certainly not occur. Therefore, to simplify a processing process, a node switching sequence is determined in this embodiment of the present invention merely from a perspective of impact of the increment on the link usage rate.

Step 102: When traffic switching needs to be performed, obtain a current performance parameter of the network, and determine, according to the mapping relationship, a switching sequence corresponding to the current performance parameter.

After the mapping relationship is established in step 101, the corresponding switching sequence may be obtained through calculation according to the current performance parameter of the network when traffic switching needs to be performed. The following two points in this step need to be described.

1. A Condition for Triggering Traffic Switching

In this embodiment of the present invention, the condition for triggering the controller to perform traffic switching may be embodied as:

a traffic switching period is preset, that is, traffic switching is performed once every other preset period; or a link usage rate threshold is preset, that is, traffic switching is performed when a link whose link usage rate exceeds the threshold exists in the network; or when a link of the network is faulty, the controller may be triggered to perform traffic switching; or the controller may perform traffic switching according to a control instruction entered by an external operator; or the like.

The condition for triggering the controller to perform traffic switching is merely described by using an example above. In a specific application process, another trigger condition may also be set, which is not specifically limited in this embodiment of the present invention, as long as the controller clearly knows when or in which case traffic switching needs to be performed.

2. A Manner of Obtaining the Current Performance Parameter

As can be known from the descriptions above, in this embodiment of the present invention, obtaining the current performance parameter of the network is actually obtaining the link usage rate before switching and the link usage rate after switching. Therefore, the node switching sequence may be determined by using the mapping relationship according to the link usage rate before switching and an increment in the link usage rate after switching relative to the link usage rate before switching.

Specifically, a process of obtaining the current performance parameter may be embodied as:

first, collecting traffic information of the network in a preset time period; and second, calculating the link usage rate before switching according to the traffic information and an old forwarding table that is used before switching, and calculating the link usage rate after switching according to the traffic information and a new forwarding table that is used after switching.

The foregoing process may be specifically embodied as the following three processing actions, which are described one by one below.

(1) The Traffic Information is Collected.

The controller receives traffic information that is reported by each forwarding node in the network in the preset time period. The traffic information represents traffic passing through the forwarding node and going to another forwarding node in the preset time period. In this way, the controller may clearly obtain traffic between a forwarding node pair in the network, and further obtain through calculation a traffic matrix by using the traffic information, for use in subsequently calculating the link usage rate.

In a preferred solution, the controller may collect traffic information in a preset time period before the traffic switching process is triggered, that is, collect current traffic information as much as possible, to ensure that the link usage rate obtained based on this calculation can more reflect current network performance, and further ensure accuracy of a subsequently obtained switching sequence.

In addition, an objective of collecting, by the controller, the traffic information of each forwarding node in the preset time period is to ensure objectivity of the traffic information, and avoid that the traffic information collected by the controller is inaccurate due to a violent traffic change occurring at some time points, which affects accuracy of subsequently calculating the link usage rate, which is also set to ensure accuracy of the subsequently obtained switching sequence.

(2) The Link Usage Rate Before Switching is Calculated.

A calculation formula of the link usage rate may be embodied as: link usage rate=traffic value/link bandwidth. For example, if a bandwidth of a link A-B is 1 Gbps, and a node A sends traffic of 0.5 Gbps to a node B, link usage rate of the link A-B occupied by the traffic is 50%.

Based on the foregoing formula, the controller may obtain through calculation, according to the traffic matrix obtained through calculation above and a forwarding table that corresponds to a network topology before switching, link usage rate of a link that is caused by traffic between each node pair; then obtain the sum of usage rate of the link that is caused by traffic between all forwarding nodes; and use the sum as link usage rate of the link.

Still using the example used above as an example, the old topology in FIG. 1 is the network topology before switching in this embodiment of the present invention, the link usage rate before switching shown in FIG. 2-1 may be obtained through calculation according to the traffic matrix and the forwarding table that are shown in Table 1. For details, refer to the foregoing content, and details are not described herein again.

(3) The Link Usage Rate after Switching is Calculated.

Similar to a calculation process of the link usage rate before switching, the controller may obtain through calculation, according to the traffic matrix obtained through calculation and a forwarding table that corresponds to a network topology after switching, link usage rate of a link by that is caused by traffic between each node pair; then obtain the sum of usage rate of the link that is caused by the traffic between all forwarding nodes; and use the sum as link usage rate of the link.

Still using the example used above as an example, the new topology in FIG. 1 is the network topology after switching in this embodiment of the present invention, the link usage rate after switching shown in FIG. 2-2 may be obtained through calculation according to the traffic matrix and the forwarding table that are shown in Table 2. For details, refer to the foregoing content, and details are not described herein again.

In addition, when traffic switching is performed by using the solution in this embodiment of the present invention, for a new network topology, a new forwarding table corresponding to the new network topology may be not installed in a forwarding node. Therefore, before calculating the link usage rate after switching, the controller should first calculate the new forwarding table, and deliver the new forwarding table to the forwarding nodes.

It should be noted that two actions that the controller calculates the link usage rate after switching according to the new forwarding table and the traffic matrix and delivers the new forwarding table to the forwarding nodes may be performed in sequence or may be simultaneously performed, which is not specifically limited in this embodiment of the present invention.

In addition, in a preferred solution, after obtaining, according to the mapping relationship, the switching sequence corresponding to the current performance parameter, the controller first determines whether the forwarding nodes complete installation of the new forwarding table, and after ensuring that the installation is completed, control, according to the switching sequence, the forwarding nodes to perform traffic switching. Alternatively, in an implementation manner, the controller may first determine whether the forwarding nodes complete installation of the new forwarding table, and after ensuring that the installation is completed, calculate the switching sequence corresponding to the current performance parameter, which is not specifically limited in this embodiment of the present invention. It should be noted that as an example in which the controller determines whether the installation is completed, waiting duration may be preset, and timing is started after the controller delivers the new forwarding table to the forwarding nodes. It may be determined that the forwarding nodes have completed the installation of the new forwarding table when the waiting duration is reached; or the controller may receive a message that is fed back by the forwarding nodes and that indicates that the installation is completed, and accordingly determine whether the forwarding nodes complete the installation of the new forwarding table. Certainly, in an application process, the controller may be enabled, in another manner according to an actual working condition, to clarify an occasion of delivering a switching instruction, which is not specifically limited in this embodiment of the present invention.

Step 103: Deliver a switching instruction to forwarding nodes according to the switching sequence, so as to control the forwarding nodes to sequentially perform traffic switching.

After the switching sequence corresponding to the current performance parameter is obtained through calculation in step 102, the controller may control, according to the switching sequence, the forwarding nodes to sequentially perform traffic switching, thereby avoiding link congestion in the switching process, and ensuring network performance.

In the example used above, if the old topology shown in FIG. 1 is switched to the new topology, a migration sequence obtained through calculation according to the solution in this embodiment of the present invention may be embodied as what is shown in the following Table 3.

TABLE 3

| $X_{n,i}$ | 1 | 2 | 3 | 4 |
|---|---|---|---|---|
| A | 1 | 0 | — | — |
| B | 1 | 0 | — | — |
| C | 1 | 0 | — | — |
| D | 0 | 1 | — | — |

Figure 4:
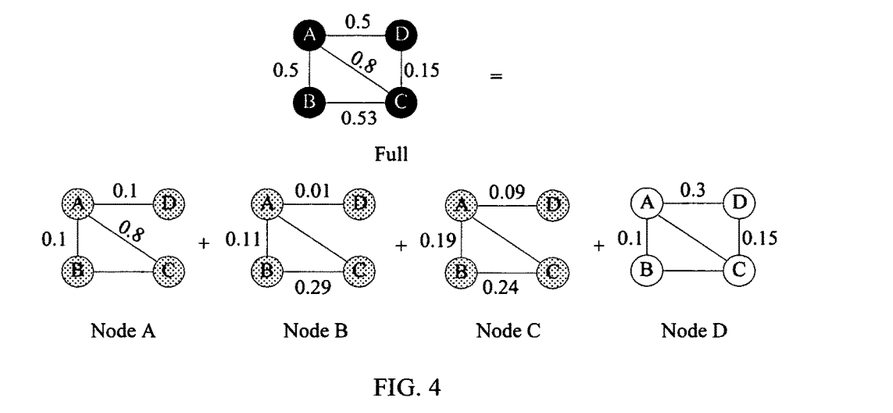
FIG. 4 is a schematic diagram of link usage rate when traffic switching is performed according to a solution in an embodiment of the present invention.

As can be known according to a value of $x_{n,i}$ in Table 3, for a switching group S1 (that is, i=1), three forwarding nodes: A, B, and C are included, that is, the three nodes may be controlled to simultaneously perform traffic switching; and a switching group S2 includes one forwarding node D, that is, after he switching group S1 completes switching, the node D may continue to be controlled to perform traffic switching. Specifically, a result shown in Table 3 may be represented as S1={ABC} and S2={D}. Correspondingly, in a process in which the controller performs traffic switching according to the sequence shown in Table 3, if S1 completes switching, and S2 does not perform switching, for a schematic diagram of link usage rate that is obtained through calculation, refer to FIG. 4. As can be seen from the figure, link usage rate of each link does not exceed a preset value being 1, that is, a link on which a congestion phenomenon occurs does not exist in the network.

As can be known from the foregoing example, in this embodiment of the present invention, the controller sequentially controls, according to the switching sequence obtained through calculation, the forwarding nodes to switch to a forwarding table in the new topology, which may be specifically embodied as: forwarding nodes belonging to a same switching group simultaneously perform traffic switching; and different switching groups sequentially perform traffic switching according to the sequence. In this process, to further ensure that a preset effect (that is, link congestion does not occur) in this embodiment of the present invention can be achieved when switching is sequentially performed, a next group may be controlled to start to perform traffic switching after it is determined that a current group completes switching. Correspondingly, the following two manner of delivering the switching instruction to the forwarding nodes are provided in this embodiment of the present invention, which are described one by one below.

In the first manner, whether switching is completed is determined according to an instruction. A specific process is: first, delivering the switching instruction to a current forwarding node according to the switching sequence; second, receiving a switching completion instruction sent by the current forwarding node; and if a forwarding node that is not switched still exists according to the switching sequence, continuing to deliver the switching instruction to the forwarding node that is not switched.

If the switching sequence of the switching groups that is obtained through calculation in step 102 is: $S_1, S_2, \ldots, S_j, S_{j+1}, \ldots$, and $S_n$, after delivering the switching instruction to the forwarding nodes included in the switching group $S_1$, the controller starts to wait to receive switching completion instructions fed back by these forwarding nodes. If the controller receives the switching completion instructions fed back by all the switching nodes included in $S_1$, the controller may determine that $S_1$ has completed traffic switching, and continue to determine whether there is subsequently a group that is not switched. If the controller determines that $S_2$ still exists, the controller continues to deliver the switching instruction to the forwarding node included in $S_2$, and waits to receive a switching completion instruction fed back by the forwarding node in this group. These processes are repeated until switching completion instructions fed back by all forwarding nodes included in $S_n$ are received, and it is determined that a group that is not switched does not exist. Therefore, all forwarding nodes in the network complete traffic switching.

In an example, message formats of the switching instruction and the switching completion instruction may be defined according to a TLV (Type, Length, Value) format:

(1) The Switching Instruction:

```
+-+-+-+-+-+-+-+-+-+-+-+-+-+-+-+-+
| Type = Switch          | (2 bytes)
+-+-+-+-+-+-+-+-+-+-+-+-+-+-+-+-+
|   Length               | (2 bytes)
+-+-+-+-+-+-+-+-+-+-+-+-+-+-+-+-+
|   Node ID (1)          | (2 bytes)
+-+-+-+-+-+-+-+-+-+-+-+-+-+-+-+-+
|   Node ID (2)          | (2 bytes)
+-+-+-+-+-+-+-+-+-+-+-+-+-+-+-+-+
|   ......               | (2 bytes)
+-+-+-+-+-+-+-+-+-+-+-+-+-+-+-+-+
|   Node ID (K)          | (2 bytes)
+-+-+-+-+-+-+-+-+-+-+-+-+-+-+-+-+
``` where Type=Switch represents a message type, which indicates that this message is a signal for controlling a forwarding node to perform traffic switching; Length represents a length of the TLV; and Node ID represents identity information of the forwarding node.

In this way, under the action of the switching instruction, after the forwarding node indicated in the instruction receives the switching instruction, the forwarding node may switch all traffic of the forwarding node as a source node.

(2) The Switching Completion Instruction:

```
+-+-+-+-+-+-+-+-+-+-+-+-+-+-+-+-+
| Type = Switch_Finish   | (2 bytes)
+-+-+-+-+-+-+-+-+-+-+-+-+-+-+-+-+
|   Length               | (2 bytes)
+-+-+-+-+-+-+-+-+-+-+-+-+-+-+-+-+
|   Node ID              | (2 bytes)
+-+-+-+-+-+-+-+-+-+-+-+-+-+-+-+-+
``` where Type=Switch_Finish represents a message type, which indicates that this message is a signal indicating that a forwarding node completes switching; Length represents a length of the TLV; and Node ID represents an identity of the forwarding node.

In this way, under the action of the switching completion instruction, the controller can clearly know a forwarding node that has completed traffic switching.

In the second manner, whether switching is completed is determined according to a time. A specific process is: first, delivering the switching instruction to a current forwarding node according to the switching sequence, and starting timing; second, if a preset time is reached, and a forwarding node that is not switched still exists according to the switching sequence, continuing to deliver the switching instruction to the forwarding node, and starting timing.

If the switching sequence of the switching groups that is obtained through calculation in step 102 is: $S_1, S_2, \ldots, S_j, S_{j+1}, \ldots$, and $S_n$, after delivering the switching instruction to the forwarding nodes included in the switching group $S_1$, the controller starts timing (in an implementation manner, a timer may be started, a counter may be started, or the like, which is not specifically limited in this embodiment of the present invention). If the preset time is reached, the controller determines that $S_1$ has completed traffic switching, and may continue to determine whether there is subsequently a group that is not switched. If the controller determines that $S_2$ still exists, the controller continues to deliver the switching instruction to the forwarding node included in $S_2$, starts timing, and determines whether the preset time is reached. These processes are repeated until the switching instruction is delivered to all forwarding nodes included in $S_n$, and it is determined that a group that is not switched does not exist in the network. Therefore, it may be determined that all forwarding nodes in the network complete traffic switching.

In conclusion, the solution in this embodiment of the present invention is described. When traffic switching needs to be performed, a controller may determine a switching sequence of forwarding nodes in a network according to a current performance parameter of the network and a pre-established mapping relationship, and sequentially control forwarding nodes to perform traffic switching. In this way, traffic switching can be systematically performed, thereby effectively avoiding link congestion in a switching process.

Figure 5:
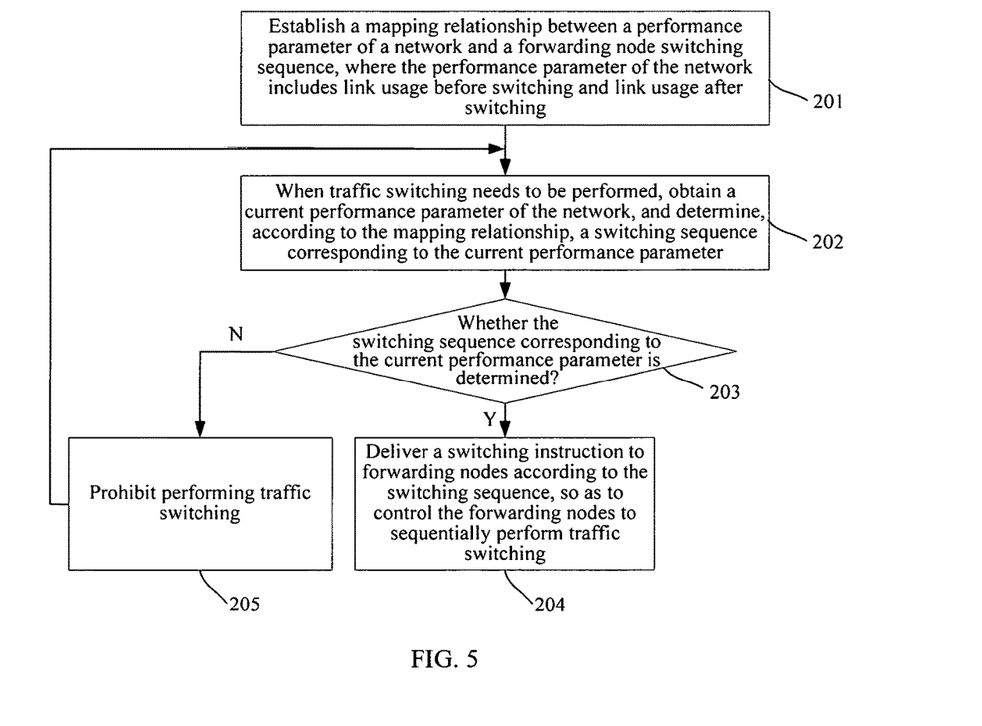
FIG. 5 is a flowchart of Embodiment 2 of a traffic switching method according to an embodiment of the present invention.

Based on Embodiment 1 above, an embodiment of the present invention further provides Embodiment 2 of a traffic switching method. For details, refer to a flowchart shown in FIG. 5. The method may include the following steps:

Step 201: Establish a mapping relationship between a performance parameter of a network and a forwarding node switching sequence, where the performance parameter of the network includes link usage rate before switching and link usage rate after switching.

Step 202: When traffic switching needs to be performed, obtain a current performance parameter of the network, and determine, according to the mapping relationship, a switching sequence corresponding to the current performance parameter.

Step 203: Determine whether the switching sequence corresponding to the current performance parameter is determined according to the mapping relationship, and if yes, perform step 204, or if not, perform step 205.

Step 204: Deliver a switching instruction to forwarding nodes according to the switching sequence, so as to control the forwarding nodes to sequentially perform traffic switching.

Step 205: Prohibit performing traffic switching, go back to step 202, and continue to try to determine the switching sequence corresponding to the current performance parameter.

Embodiment 2 is specific to a scenario in which an overall level of traffic in the network is relatively high. In this scenario, the switching sequence corresponding to the current performance parameter may be not obtained by using the solution in this embodiment of the present invention, that is, there is no solution to a model. In this case, a controller determines that traffic switching is not suitable to be currently performed, and may return to try to determine the switching sequence again, or may try to determine the switching sequence according to the solution in this embodiment of the present invention after waiting for a period of time or after the traffic of the network decreases. That is, in this embodiment of the present invention, an advanced warning about network congestion may also be given according to a calculation result. In a case in which link congestion is caused regardless of a traffic switching sequence, any switching operation should be avoided, to reduce control resources.

Correspondingly, an advanced warning cannot be given in all-switching or single-point switching in the prior art, and it can be learned that traffic switching is not suitable to be currently performed only when it is found that severe link congestion occurs in a switching process. In this case, to ensure network performance to some extent, the controller controls a forwarding node that has completed traffic switching to fall back to a forwarding table used before switching. That is, a switching solution in the prior art may worsen network congestion and may even cause a waste of control resources of the controller.

Corresponding to the method shown in FIG. 3, an embodiment of the present invention further provides a traffic switching apparatus, which may be understood as the foregoing controller.

Figure 6:
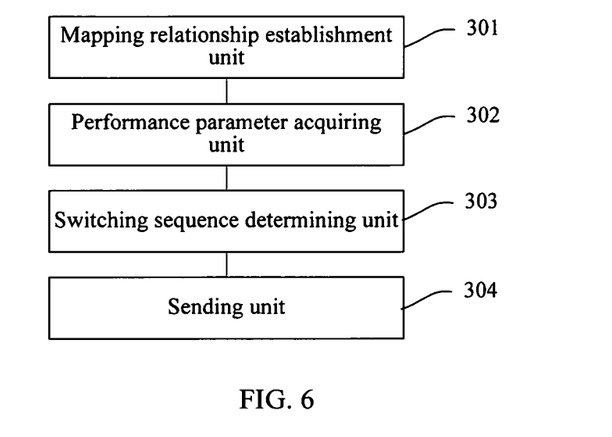
FIG. 6 is a schematic composition diagram of Embodiment 1 of a traffic switching apparatus according to an embodiment of the present invention.

Referring to a schematic diagram shown in FIG. 6, the traffic switching apparatus may include:

a mapping relationship establishment unit 301, configured to establish a mapping relationship between a performance parameter of a network and a forwarding node switching sequence, where the performance parameter of the network includes link usage rate before switching and link usage rate after switching;

a performance parameter obtaining unit 302, configured to: when traffic switching needs to be performed, obtain a current performance parameter of the network;

a switching sequence determining unit 303, configured to determine, according to the mapping relationship, a switching sequence corresponding to the current performance parameter; and a sending unit 304, configured to deliver a switching instruction to forwarding nodes according to the switching sequence, so as to control the forwarding nodes to sequentially perform traffic switching.

To avoid occurrence of a link congestion phenomenon in a traffic switching process, in this embodiment of the present invention, a mapping relationship between a performance parameter of a network and a node switching sequence is pre-established, and then when it is determined that traffic switching needs to be performed, a switching sequence among switching nodes is obtained by using a current performance parameter of the network that is obtained in real time and the pre-established mapping relationship. In this way, under the control of the traffic switching apparatus in this embodiment of the present invention, the nodes sequentially complete traffic switching. Therefore, it can be ensured that in the switching process, link usage rate does not exceed a preset value and the link congestion phenomenon will not occur.

Preferably, the mapping relationship establishment unit in this embodiment of the present invention may include:

a switching group division unit, configured to divide the forwarding nodes to different switching groups, where each forwarding node belongs to only one switching group;

a switching group sequence determining unit, configured to determine a switching sequence of switching groups according to an increment in link usage rate in a switching process, where a sum of the increment and the link usage rate before switching is not greater than a preset value; and a forwarding node sequence determining unit, configured to determine a switching sequence of the forwarding nodes according to the switching sequence of the switching groups.

Specifically, the switching group sequence determining unit determines the switching sequence of the switching groups in the following manner:

a target function: min Z; and constraint conditions:

$$\begin{cases} \sum_{i=1}^{N} x_{n,i} = 1, (n = 1, 2, \ldots, N) & (1) \\ y_i \geq \sum_{n=1}^{N} x_{n,i} (i = 1, 2, \ldots, N) & (2) \\ \sum_{n=1}^{N} x_{n,i} * l_{n,e} \leq 1 - s_e - \sum_{j=1}^{i-1} \sum_{n=1}^{N} x_{n,i} * c_{n,e}, & (3) \\ \quad (i = 1, 2, \ldots, N; e = 1, 2, \ldots, M) \\ y_{i+1} \leq y_i, (i = 1, 2, \ldots, N-1) & (4) \\ Z = \sum_{i=1}^{N} y_i & (5) \\ x_{n,i} = 0 \text{ or } x_{n,i} = 1, (n = 1, 2, \ldots, N; i = 1, 2, \ldots, N) & (6) \\ y_i = 0 \text{ or } y_i = 1, (i = 1, 2, \ldots, N), & (7) \end{cases}$$

where Z represents a quantity of switching groups; N represents a quantity of forwarding nodes; M represents a quantity of links; $x_{n,i}$ represents that a forwarding node n belongs to an $i^{th}$ switching group; $y_i$ represents whether the $i^{th}$ switching group is an empty set; $s_e$ represents link usage rate before switching of a link e; $c_{n,e}$ represents a variation of link usage rate of the link e that is caused by the forwarding node n; and $t_{n,e}$ represents an increment in the link usage rate of the link e that is caused by the forwarding node n.

Preferably, the performance parameter obtaining unit in this embodiment of the present invention may include:

a collection unit, configured to collect traffic information of the network in a preset time period; and a calculation unit, configured to: calculate the link usage rate before switching according to the traffic information and an old forwarding table that is used before switching, and calculate the link usage rate after switching according to the traffic information and a new forwarding table that is used after switching.

For a process of collecting the traffic information and a process of calculating the link usage rate before switching and the link usage rate after switching, refer to the descriptions in the foregoing method embodiments, and details are not described herein again.

Further, to ensure that a preset effect (that is, link congestion does not occur) in this embodiment of the present invention can be achieved when switching is sequentially performed, a next group may be controlled to start to perform traffic switching after it is determined that a current group completes switching. Correspondingly, two preferred composition solutions of the sending unit are provided in this embodiment of the present invention, which are described one by one below.

In the first solution, the sending unit in this embodiment of the present invention may include:

a sending subunit, configured to deliver the switching instruction to a current forwarding node according to the switching sequence; and a receiving unit, configured to: receive a switching completion instruction sent by the current forwarding node, and if a forwarding node that is not switched still exists according to the switching sequence, instruct the sending subunit to continue to deliver the switching instruction to the forwarding node that is not switched.

In the second solution, the sending unit in this embodiment of the present invention may include:

a sending subunit, configured to deliver the switching instruction to a current forwarding node according to the switching sequence; and a timing unit, configured to: start timing after the sending subunit delivers the switching instruction, and if a preset time is reached, and a forwarding node that is not switched still exists according to the switching sequence, instruct the sending subunit to continue to deliver the switching instruction to the forwarding node that is not switched, and start timing.

Figure 7:
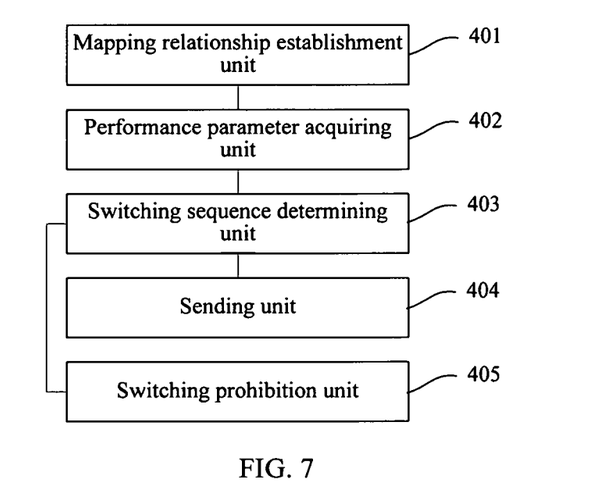
FIG. 7 is a schematic composition diagram of Embodiment 2 of a traffic switching apparatus according to an embodiment of the present invention.

Corresponding to the method shown in FIG. 6, an embodiment of the present invention further provides Embodiment 2 of a traffic switching apparatus. For details, refer to a schematic structural diagram shown in FIG. 7. The apparatus may include:

a mapping relationship establishment unit 401, configured to establish a mapping relationship between a performance parameter of a network and a forwarding node switching sequence, where the performance parameter of the network includes link usage rate before switching and link usage rate after switching;

a performance parameter obtaining unit 402, configured to: when traffic switching needs to be performed, obtain a current performance parameter of the network;

a switching sequence determining unit 403, configured to determine, according to the mapping relationship, a switching sequence corresponding to the current performance parameter;

a sending unit 404, configured to when the switching sequence determining unit determines the switching sequence corresponding to the current performance parameter, deliver a switching instruction to forwarding nodes according to the switching sequence, so as to control the forwarding nodes to sequentially perform traffic switching; and a switching prohibition unit 405, configured to: when the switching sequence determining unit does not determine the switching sequence corresponding to the current performance parameter, prohibit performing traffic switching, until the switching sequence determining unit can determine the switching sequence corresponding to the current performance parameter.

In this embodiment, if the switching sequence determining unit does not determine the switching sequence corresponding to the current performance parameter, it may determined that an overall level of traffic of the network is relatively high, and traffic switching is not suitable to be performed. In this case, the switching prohibition unit may be instructed not to do any switching operation until the switching sequence can be determined. In this way, an advanced warning about network congestion may be given according to a result output by the switching sequence determining unit, thereby avoiding an unnecessary switching operation, and reducing control resources.

Specifically, an action of determining whether the switching sequence determining unit determines the switching sequence corresponding to the current performance parameter may be implemented by the switching sequence unit, and the sending unit or the switching prohibition unit may be controlled, according to a determining result, to perform subsequent processing. Alternatively, a judging unit may be further disposed at an output end of the switching sequence determining unit. The judging unit identifies a result specifically input by the switching sequence determining unit, and further controls, according to an identification result, the sending unit or the switching prohibition unit to perform subsequent processing, which may not be specifically limited in this embodiment of the present invention and may be determined according to an actual application situation.

Further, an embodiment of the present invention further provides hardware composition of a traffic switching apparatus. Referring to a schematic diagram shown in FIG. 8, the apparatus may include at least one processor (for example, a CPU), at least one network interface, or another communications interface, a memory, and at least one communications bus, which is configured to implement connections and communication between these apparatuses. The processor is configured to execute an executable module, such as a computer program, stored in the memory. The memory may include a high-speed random access memory (RAM: Random Access Memory), or may further include a non-volatile memory (non-volatile memory), for example, at least one magnetic disk storage. A communication connection between the system gateway and at least one other network element is implemented by using the at least one network interface (which may be wired or wireless), and the Internet, a wide area network, a local network, a metropolitan area network, and the like may be used.

Figure 8:
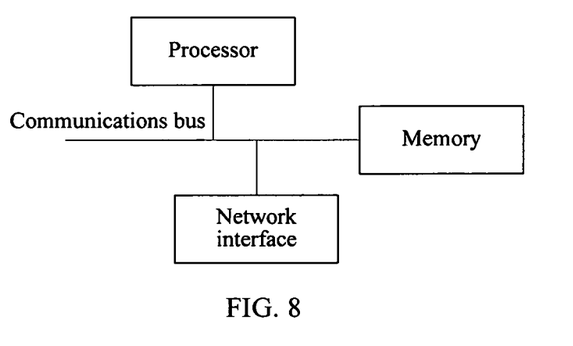
FIG. 8 is a schematic composition diagram of hardware of a traffic switching apparatus according to an embodiment of the present invention.

In some implementation manners, the memory stores program instructions, and the processor is configured to execute the following steps according to these program instructions:

establishing a mapping relationship between a performance parameter of a network and a forwarding node switching sequence, where the performance parameter of the network includes link usage rate before switching and link usage rate after switching;

when traffic switching needs to be performed, obtaining a current performance parameter of the network, and determining, according to the mapping relationship, a switching sequence corresponding to the current performance parameter; and delivering a switching instruction to forwarding nodes according to the switching sequence, so as to control the forwarding nodes to sequentially perform traffic switching.

Preferably, the processor may establish the mapping relationship according to the following steps:

dividing the forwarding nodes to different switching groups, where each forwarding node belongs to only one switching group;

determining a switching sequence of switching groups according to an increment in link usage rate in a switching process, where a sum of the increment and the link usage rate before switching is not greater than a preset value; and determining a switching sequence of the forwarding nodes according to the switching sequence of the switching groups.

Preferably, the processor may determine the switching sequence of the switching groups in the following manner:

a target function: min Z; and
constraint conditions:

$$\begin{cases} \sum_{i=1}^{N} x_{n,i} = 1, (n = 1, 2, \ldots, N) & (1) \\ y_i \geq \sum_{n=1}^{N} x_{n,i} (i = 1, 2, \ldots, N) & (2) \\ \sum_{n=1}^{N} x_{n,i} * t_{n,e} \leq 1 - s_e - \sum_{j=1}^{i-1} \sum_{n=1}^{N} x_{n,i} * c_{n,e}, & (3) \\ (i = 1, 2, \ldots, N; e = 1, 2, \ldots, M) \\ y_{i+1} \leq y_i, (i = 1, 2, \ldots, N-1) & (4) \\ Z = \sum_{i=1}^{N} y_i & (5) \\ x_{n,i} = 0 \text{ or } x_{n,i} = 1, (n = 1, 2, \ldots, N; i = 1, 2, \ldots, N) & (6) \\ y_i = 0 \text{ or } y_i = 1, (i = 1, 2, \ldots, N), & (7) \end{cases}$$

where Z represents a quantity of switching groups; N represents a quantity of forwarding nodes; M represents a quantity of links; $x_{n,i}$ represents that a forwarding node n belongs to an $i^{th}$ switching group; $y_i$ represents whether the $i^{th}$ switching group is an empty set; $s_e$ represents link usage rate before switching of a link e; $c_{n,e}$ represents a variation of link usage rate of the link e that is caused by the forwarding node n; and $t_{n,e}$ represents an increment in the link usage rate of the link e that is caused by the forwarding node n.

Preferably, the processor may obtain the current performance parameter according to the following steps:

collecting traffic information of the network in a preset time period; and calculating the link usage rate before switching according to the traffic information and an old forwarding table that is used before switching, and calculating the link usage rate after switching according to the traffic information and a new forwarding table that is used after switching.

Preferably, the processor may deliver the switching instruction to the forwarding nodes according to the following steps:

delivering the switching instruction to a current forwarding node according to the switching sequence; and receiving a switching completion instruction sent by the current forwarding node, and if a forwarding node that is not switched still exists according to the switching sequence, continuing to deliver the switching instruction to the forwarding node that is not switched.

Preferably, the processor may deliver the switching instruction to the forwarding nodes according to the following steps:

delivering the switching instruction to the current forwarding node according to the switching sequence, and starting timing; and if a preset time is reached, and a forwarding node that is not switched still exists according to the switching sequence, continuing to deliver the switching instruction to the forwarding node that is not switched, and starting timing.

Preferably, the processor may further perform the following step:

if the switching sequence corresponding to the current performance parameter is not determined according to the mapping relationship, prohibiting performing traffic switching, until the switching sequence corresponding to the current performance parameter can be determined.

The solutions in the present invention can be described in the general context of executable computer instructions executed by a computer, for example, a program unit. Generally, the program unit includes a routine, program, object, component, data structure, and the like for executing a particular task or implementing a particular abstract data type. The solutions in the present invention may also be practiced in distributed computing environments in which tasks are performed by remote processing devices that are connected through a communications network. In a distributed computing environment, program units may be located in both local and remote computer storage media including storage devices.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

The embodiments of the present invention are described in detail above. The present invention is described herein through specific implementation manners. The description about the embodiments of the present invention is merely provided to help understand the method and device of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A traffic switching method comprising:
dividing, by a traffic switching apparatus, forwarding nodes to different switching groups, wherein each of the forwarding nodes belongs to only one switching group;
determining, by the traffic switching apparatus, a switching sequence of switching groups according to an increment in link usage rate in a switching process;
determining, by the traffic switching apparatus, a switching sequence of the forwarding nodes according to the switching sequence of the switching groups; and
delivering, by the traffic switching apparatus, a switching instruction to at least one of the forwarding nodes according to the switching sequence of the forwarding nodes.

2. The method according to claim 1, wherein the switching sequence of the switching groups is determined in the following manner:
a target function: min Z; and
constraint conditions:

$$\begin{cases} \sum_{i=1}^{N} x_{n,i} = 1, (n = 1, 2, \ldots, N) & (1) \\ y_i \geq \sum_{n=1}^{N} x_{n,i} (i = 1, 2, \ldots, N) & (2) \\ \sum_{n=1}^{N} x_{n,i} * t_{n,e} \leq 1 - s_e - \sum_{j=1}^{i-1} \sum_{n=1}^{N} x_{n,i} * c_{n,e}, & (3) \\ (i = 1, 2, \ldots, N; e = 1, 2, \ldots, M) \\ y_{i+1} \leq y_i, (i = 1, 2, \ldots, N-1) & (4) \\ Z = \sum_{i=1}^{N} y_i & (5) \\ x_{n,i} = 0 \text{ or } x_{n,i} = 1, (n = 1, 2, \ldots, N; i = 1, 2, \ldots, N) & (6) \\ y_i = 0 \text{ or } y_i = 1, (i = 1, 2, \ldots, N), & (7) \end{cases}$$

wherein Z represents a quantity of switching groups; N represents a quantity of forwarding nodes; M represents a quantity of links; $x_{n,i}$ represents that a forwarding node n belongs to an $i^{th}$ switching group; $y_i$ represents whether the $i^{th}$ switching group is an empty set; $s_e$ represents link usage rate before switching of a link e; $c_{n,e}$ represents a variation of link usage rate of the link e that is caused by the forwarding node n; and $t_{n,e}$ represents an increment in the link usage rate of the link e that is caused by the forwarding node n.

3. The method according to claim 1, wherein the delivering, by the traffic switching apparatus, a switching instruction to at least one of the forwarding nodes according to the switching sequence comprises:
delivering, by the traffic switching apparatus, the switching instruction to a current forwarding node according to the switching sequence; and
receiving, by the traffic switching apparatus, a switching completion instruction sent by the current forwarding node, and if a forwarding node that is not switched still exists according to the switching sequence, continuing to deliver the switching instruction to the forwarding node that is not switched.

4. The method according to claim 1, wherein the delivering, by the traffic switching apparatus, a switching instruction to at least one of the forwarding nodes according to the switching sequence comprises:
delivering, by the traffic switching apparatus, the switching instruction to a current forwarding node according to the switching sequence, and starting timing; and
if a preset time is reached, and a forwarding node that is not switched still exists according to the switching sequence, continuing, by the traffic switching apparatus, to deliver the switching instruction to the forwarding node that is not switched, and starting timing.

5. The method according to claim 1, wherein a sum of the increment and the link usage rate before switching is not greater than a preset value.

6. A traffic switching apparatus comprising:
a non-transitory memory storage comprising instructions; and
one or more processors in communication with the memory, wherein the one or more processors execute the instructions to cause the traffic switching apparatus to:
divide forwarding nodes to different switching groups, wherein each of the forwarding nodes belongs to only one switching group;
determine a switching sequence of switching groups according to an increment in link usage rate in a switching process;
determine a switching sequence of the forwarding nodes according to the switching sequence of the switching groups; and
deliver a switching instruction to at least one of the forwarding nodes according to the switching sequence of the forwarding nodes.

7. The apparatus according to claim 6, wherein the one or more processors execute the instructions to determine the switching sequence of the switching groups in the following manner:
a target function: min Z; and
constraint conditions:

$$\begin{cases} \sum_{i=1}^{N} x_{n,i} = 1, (n = 1, 2, \ldots, N) & (1) \\ y_i \geq \sum_{n=1}^{N} x_{n,i} (i = 1, 2, \ldots, N) & (2) \\ \sum_{n=1}^{N} x_{n,i} * t_{n,e} \leq 1 - s_e - \sum_{j=1}^{i-1} \sum_{n=1}^{N} x_{n,i} * c_{n,e}, & (3) \\ (i = 1, 2, \ldots, N; e = 1, 2, \ldots, M) \\ y_{i+1} \leq y_i, (i = 1, 2, \ldots, N-1) & (4) \\ Z = \sum_{i=1}^{N} y_i & (5) \\ x_{n,i} = 0 \text{ or } x_{n,i} = 1, (n = 1, 2, \ldots, N; i = 1, 2, \ldots, N) & (6) \\ y_i = 0 \text{ or } y_i = 1, (i = 1, 2, \ldots, N), & (7) \end{cases}$$

wherein Z represents a quantity of switching groups; N represents a quantity of forwarding nodes; M represents a quantity of links; $x_{n,i}$ represents that a forwarding node n belongs to an $i^{th}$ switching group; $y_i$ represents whether the $i^{th}$ switching group is an empty set; $s_e$ represents link usage rate before switching of a link e; $c_{n,e}$ represents a variation of link usage rate of the link e that is caused by the forwarding node n; and $t_{n,e}$ represents an increment in the link usage rate of the link e that is caused by the forwarding node n.

8. The apparatus according to claim 6, wherein the one or more processors execute the instructions to:

deliver the switching instruction to a current forwarding node according to the switching sequence; and receive a switching completion instruction sent by the current forwarding node, and if a forwarding node that is not switched still exists according to the switching sequence, instruct the sending subunit to continue to deliver the switching instruction to the forwarding node that is not switched.

9. The apparatus according to claim 6, wherein the one or more processors execute the instructions to:

deliver the switching instruction to a current forwarding node according to the switching sequence; and start timing after the sending subunit delivers the switching instruction, and if a preset time is reached, and a forwarding node that is not switched still exists according to the switching sequence, instruct the sending subunit to continue to deliver the switching instruction to the forwarding node that is not switched, and start timing.

10. The apparatus according to claim 6, wherein a sum of the increment and the link usage rate before switching is not greater than a preset value.

* * * * *